United States Patent [19]
Hargett et al.

[11] Patent Number: 6,022,067
[45] Date of Patent: Feb. 8, 2000

[54] CORNER ASSEMBLY FOR A TRUCK BODY

[75] Inventors: John A. Hargett; Charles R. Martin, both of High Point, N.C.

[73] Assignee: W. F. Mickey Body Company, High Point, N.C.

[21] Appl. No.: 09/021,919

[22] Filed: Feb. 11, 1998

[51] Int. Cl.[7] .................................................. B60J 7/00
[52] U.S. Cl. ..................... 296/183; 296/181; 296/155
[58] Field of Search .................................. 296/181, 183, 296/155, 202, 146.8, 99.1, 100.09

[56] References Cited

U.S. PATENT DOCUMENTS

| | | |
|---|---|---|
| 3,042,227 | 7/1962 | Tantlinger . |
| 3,044,653 | 7/1962 | Tantlinger . |
| 3,980,196 | 9/1976 | Paulyson et al. ......................... 220/1.5 |
| 4,054,226 | 10/1977 | Bjelland et al. . |
| 4,124,136 | 11/1978 | Bjelland et al. . |
| 4,511,173 | 4/1985 | Wentzel ................................. 296/156 |
| 4,650,381 | 3/1987 | Durkin ..................................... 410/43 |
| 4,986,705 | 1/1991 | Durkin . |
| 5,154,468 | 10/1992 | Teigen et al. ........................ 296/155 X |
| 5,165,746 | 11/1992 | Teigen ................................. 296/155 X |
| 5,184,864 | 2/1993 | Teigen et al. ........................ 296/155 X |
| 5,238,283 | 8/1993 | Teigen ................................. 296/155 X |
| 5,501,503 | 3/1996 | Thayer ................................ 296/146.8 |
| 5,921,611 | 7/1999 | Townsend .............................. 296/155 |

OTHER PUBLICATIONS

W. F. Mickey Body Company, Inc. brochure entitled "Van Bodies Built Today for Tomorrow" (undated).

*Primary Examiner*—D. Glenn Dayoan
*Assistant Examiner*—Lori L. Coletta
*Attorney, Agent, or Firm*—Kennedy, Covington, Lobdell & Hickman, LLP

[57] ABSTRACT

The present invention relates to a sub-frame assembly for a truck body having a roll-up door, a radius top header formed with a radius on its lateral axis, an extruded top cross-piece, an extruded corner post formed with an integral door-track groove, an extruded bottom cross-piece, and an extruded bottom rail. The subframe assembly includes a structural top corner casting body which has a roll-up door track segment formed integrally with the top corner casting body, a top gusset stiffener plate formed integrally with the top corner casting body, and a radius top header edge formed integrally with the top corner casting body, the radius top header edge being formed to abut the radius top header at a juncture that will permit the radius top header to be lap-welded to the radius top header edge. The top corner casting body also has, formed integrally with it and projecting outwardly from it, a top corner post lug formed to be received by the corner post in lapping abutment, and a top cross-piece lug formed to be received by the top cross-piece in lapping abutment. A structural bottom corner casting body has, formed integrally with it and projecting outwardly from it, a bottom corner post lug formed to received by the corner post in lapping abutment, a bottom cross-piece lug formed to be received by the bottom cross-piece in lapping abutment, and a bottom rail lug formed to receive the bottom rail in lapping abutment.

13 Claims, 8 Drawing Sheets

CORNER ASSEMBLY FOR A TRUCK BODY

BACKGROUND OF THE INVENTION

The present invention relates generally to the structural configuration of a truck body having at least one roll-up door for loading and unloading cargo therethrough, and more particularly to a sub-frame assembly which provides a high level of strength, ease of fabrication, and efficient connection of structural components. It will be understood that truck body, as used herein, also includes trailers and the like.

The addition of one or more roll-up doors to a truck body adds significantly to the efficiency of loading and unloading cargo for the truck body. If a roll-up door is located on a longitudinal side wall of a typical truck body, a large opening is provided through which much of the cargo in the truck body can be directly accessed without having to rearrange the load. The use of a roll-up door also allows the truck body to be parked and unloaded in smaller areas where traditional hinged doors, which require considerable space for swinging open the doors, could not be used. For delivery services such as beverage distributors, which may need to stock a large variety of different beverage products at each retail beverage outlet which is served by the distributor, truck bodies having roll-up doors are particularly beneficial and save much time which would otherwise be lost in rearranging cargo or parking some distance away in a more open space.

The use of large roll-up doors, however, significantly reduces the structural rigidity of the truck body, and places additional stresses on the corner connections of the truck body. Because the large opening in the side wall of the truck body eliminates at least some horizontal structural members which would otherwise provide strength and rigidity to the body, the corner connections of the truck body must therefore withstand greater loads. Consequently, manufacturers and purchasers of truck bodies with roll-up doors have experienced relatively high rates of failure in the corner connections of truck bodies with roll-up doors, particularly where the roll-up door is located on a longitudinal side wall of the truck body. In order to save weight, many of the structural components in truck bodies are typically aluminum, and in a large number of cases, particularly for beverage-type truck bodies, all structural components are aluminum. The use of lighter-weight aluminum components allows the truck body to carry a larger payload of cargo, but may increase the vulnerability of certain structural components to fracture and fatigue.

Furthermore, having a roll-up door or doors extending the entire length of one or both side walls of the truck body, which is a desirable arrangement providing the greatest access to the interior of the truck body, results in a roll-up door track being adjacent to one or more corners of the truck body, thereby requiring that each such track be incorporated in the respective sub-frame upper corner assembly to securely anchor it. Including a door track in an upper corner assembly adds considerable complexity to the assembly, which also typically includes a gusset plate, a spacer shim, and a surface for welding a radius header thereto. The time and expense of fabricating the corner assembly increase significantly when a roll-up door track must be incorporated in the truck body.

In conventional truck bodies, the structural members meeting at the upper corners are riveted to a relatively lightweight aluminum corner piece. This arrangement does not provide a durable, high strength connection, and is prone to structural failure. In conventional truck bodies with roll-up doors, the various parts incorporating the door track, gusset place, spacer shim, and exterior corner piece are separately fabricated and then welded together. This composite assembly is butt-welded to the corner post, top rail, and other structural members of the truck body. The fabrication and connection of this type of assembly is difficult, time-consuming, and costly. Moreover, given the large number of butt-welded joints in the assembly and in its connection to the structural members of the truck body, the strength of the assembly is not high, and structural failures are common.

In a different field, prior art patents show the use of corner castings in containers intended for combined overland and marine transportation of goods, as disclosed in Taintlinger U.S. Pat. No. 3,044,653, Durkin U.S. Pat. No. 4,650,381, Durkin U.S. Pat. No. 4,986,705. These corner castings serve specialized purposes and have a highly specialized form, however, in that they protrude outwardly from the rest of the structure of the container and are provided with a type of keyhole aperture for connection with a grappling device that includes a rotating pin having projecting lugs. The entire container may be engaged by the grappling device and hoisted by a lifting mechanism, and then stacked with other containers so that the protruding corner castings of each container are in contact with the protruding corner castings of containers stacked either above or below. These prior art references, which do not incorporate roll-up door openings in the containers involved, do not disclose advantages which would overcome the problems in conventional truck bodies with roll-up doors.

In accordance with the present invention, a sub-frame assembly for a truck body having a roll-up door is provided which possesses a high degree of structural strength, which is easy to fabricate, and which is easily connected to the structural frame of the truck body.

SUMMARY OF THE INVENTION

Briefly summarized, the present invention provides a sub-frame assembly for a truck body having a roll-up door for loading and unloading cargo therethrough, a radius top header formed with a radius on its lateral axis, an extruded top cross-piece, an extruded corner post formed with a longitudinally extending integral door track groove, an extruded bottom cross-piece, and an extruded bottom rail. The sub-frame assembly of the present invention comprises a structural top corner casting body, a roll-up door track segment formed integrally with said top corner casting body, the door track segment being formed for receiving the roll-up door, a radius top header edge formed integrally with the top corner casting body, the radius top header edge being formed to abut the radius top header at a junction that will permit the radius top header to be lap-welded to the radius top header edge, a top corner post lug projecting outwardly from the top corner casting body, the top corner post lug being formed to be received in lapping abutment by the corner post at a juncture that will permit the corner post to be lap-welded to the top corner post lug, and a top cross-piece lug projecting outwardly from the top corner casting body different from the aforesaid first direction, the top cross-piece lug being formed to be received in lapping abutment by the top cross-piece at a juncture that will permit the top cross-piece to be lap-welded to the top cross-piece lug.

The present invention also included a structural bottom corner casting body, a bottom corner post lug projecting outwardly from the bottom corner casting body the bottom corner post lug being formed to be received in lapping abutment by the corner post at a juncture that will permit the corner post to be lap-welded to the bottom corner post lug, a bottom cross-piece lug projecting outwardly from the bottom corner casting body in a direction parallel to the top cross-piece lug, the bottom cross-piece lug being formed to be received in lapping abutment by the bottom cross-piece at a juncture that will permit the bottom cross-piece to be lap-welded to the bottom cross-piece lug, and a bottom rail lug projecting outwardly from the bottom corner casting body different from the aforesaid third direction, the bottom rail lug formed to be received by the bottom rail in a lapping abutment at a juncture that will permit the bottom rail to be lap-welded to the bottom rail lug.

Preferably, a top gusset stiffener plate is formed integrally with the top corner casting body. It is also advantageous if the extruded corner post, the extruded top cross-piece, the extruded bottom cross-piece, and the extruded bottom rail each have a plurality of side walls extending laterally in angular relation to one another so as to form a partially enclosed central cavity defined by the side walls, and the top corner post lug is formed to be received in the central cavity of the corner post, the top cross-piece lug is formed to be received in the central cavity of the top cross-piece, the bottom corner post lug is formed to be received in the central cavity of the corner post, the bottom cross-piece lug is formed to be received in the central cavity of the bottom cross-piece, and the bottom rail lug is formed to be received in central cavity of the bottom rail.

The truck body may include a locking bar for selectively locking the roll-up door in a closed position, and the top corner casting body preferably defines a locking bar access aperture sized to permit the locking bar to pass therethrough for selective removal from the truck body.

Another roll-up door may be provided on the truck body, and the pair of doors may be opposed and located on opposing sides of the truck body. The truck body may further include a second radius top header and a second corner post. The sub-frame assembly of the present invention may include a top cross-piece having first and second door track segments formed therein, each of the door track segments for receiving one of the doors therein. The first structural top corner casting body has a first integral roll-up door track segment formed for receiving one of the doors therein and for adjoining the first door track segment of the top cross-piece. A second structural top corner casting body may be provided with a second integral roll-up door track segment formed for receiving the other of the doors therein and for adjoining the second door track segment of the top cross-piece, and with a radius top header edge formed to abut the second radius top header. The second structural top corner may also be provided with a second top corner post lug projecting outwardly from the second top corner casting body in the first direction and formed to be received in lapping abutment by the second corner post, and with a second top cross-piece lug projecting outwardly from the second top corner casting body in another direction and formed to be received in lapping abutment by the top cross-piece, whereby one of the doors is received for roll-up along the first integral door track segment of the first top corner casting body and the first door track segment of the top cross-piece, and the other of the doors is received for roll-up along the second integral door track segment of the second top corner casting body and the second door track segment of the top cross-piece.

DETAILED DESCRIPTION OF THE PREFERRED EMBODIMENT

Figure 1:
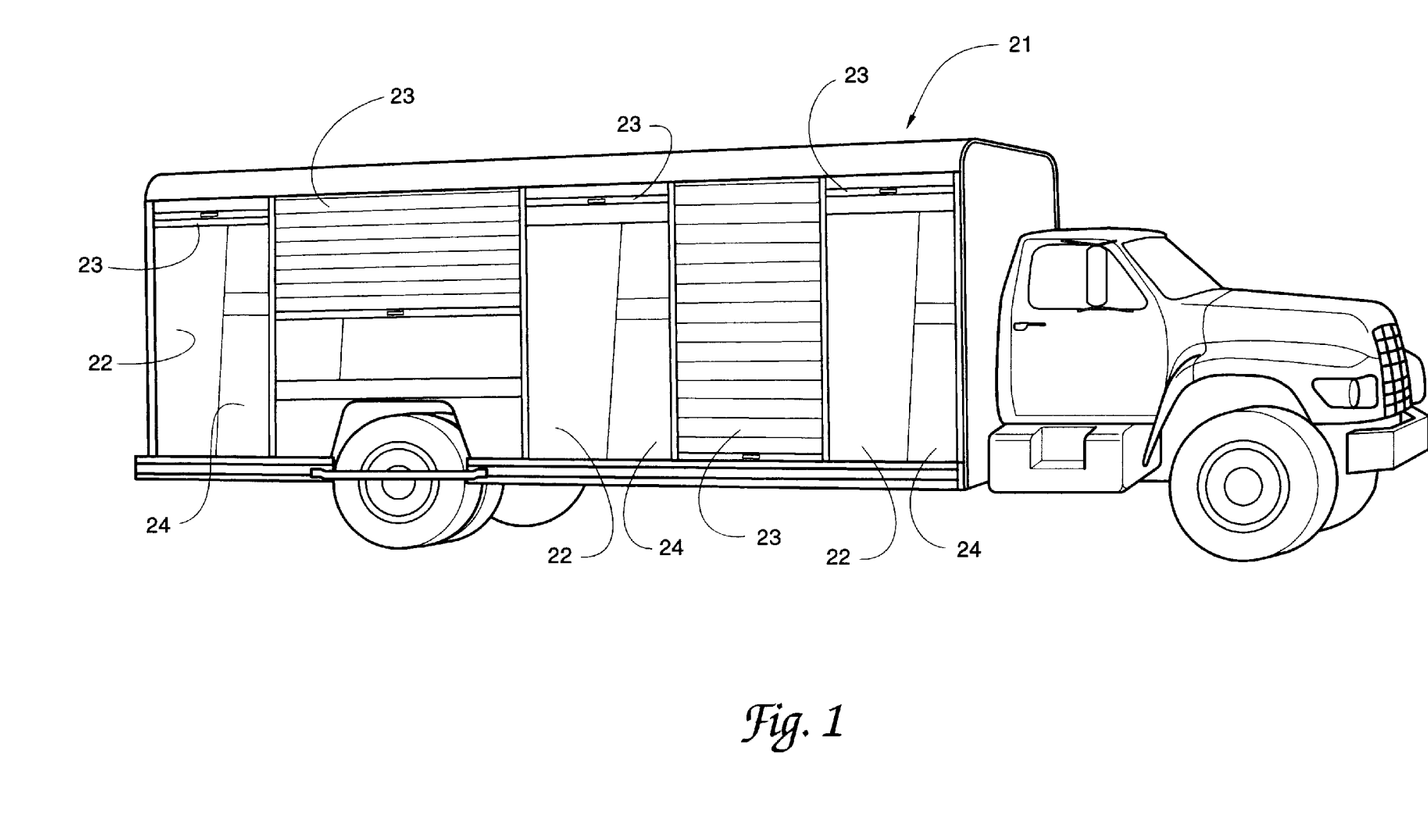
FIG. 1 is a perspective view of a truck with a truck body having roll-up doors on a longitudinal side wall.

Looking now in greater detail at the accompanying drawings, FIG. 1 is a perspective view which illustrates a conventional truck with a truck body 21 having typical roll-up doors 23, such as could be utilized for transporting and delivering cargo such as beverages to retail stores, and in which the present invention is particularly useful. Bay partitions 22 and bay back walls 24 define a number of bay areas for accommodating the aforementioned cargo. Roll-up doors 23 are shown with some doors completely closed, some doors partially open, and some doors completely open. Roll-up doors 23 would typically be closed during movement of the truck so as to protect the cargo carried in truck body 21, and opened as needed for loading and unloading cargo. It will be understood that the truck body 21 may also be provided with a set of roll-up doors 23 on its other side or rear face in the same manner.

Figure 2:
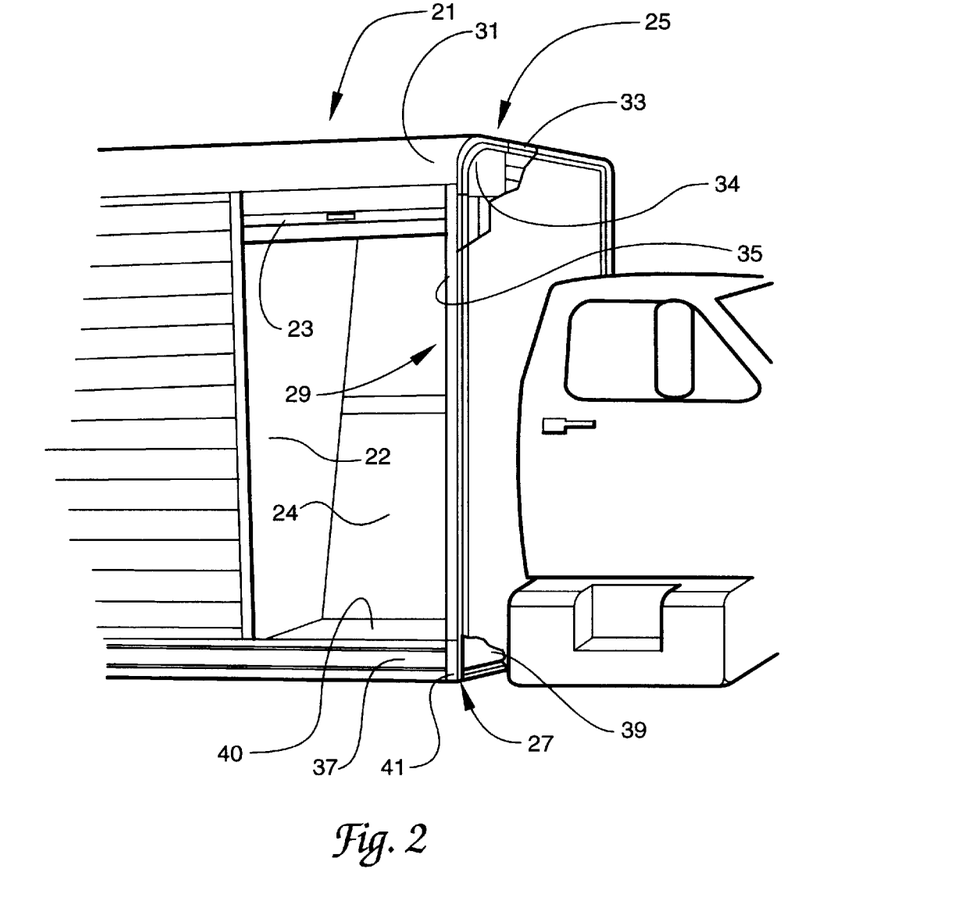
FIG. 2 is a view of the portion of the truck body of FIG. 1 with the outer covering partially broken away to show the sub-frame assembly of the present invention.

FIG. 2 is a partial perspective view of the truck body 21 showing a top corner 25 and a bottom corner 27 of the sub-frame assembly 29 of the present invention along with roll-up door 23, with portions of the outer covering of the truck body 21 removed to expose the sub-frame assembly 29. Radius top header 31, extruded top cross-piece 33, and extruded corner post 35 are all joined to top corner casting body 34 to form a structural connection at the top corner 25, and corner post 35, extruded bottom rail 37 and extruded bottom cross-piece 39 area all joined to a bottom corner casting 41 to form a structural connection at the bottom corner 27. A bay floor surface 40 is provided for supporting cargo within the truck body 21.

From FIG. 2 it can be seen that the structural connections at the top corner 25 and bottom corner 27 of truck body 21 are of particular importance to the structural integrity of truck body 21, and that a failure at either of these locations would seriously compromise the structure of the truck body 21. FIG. 2 also shows the number of significant structural members which are joined at top corner 25 and bottom corner 27.

Figure 3:
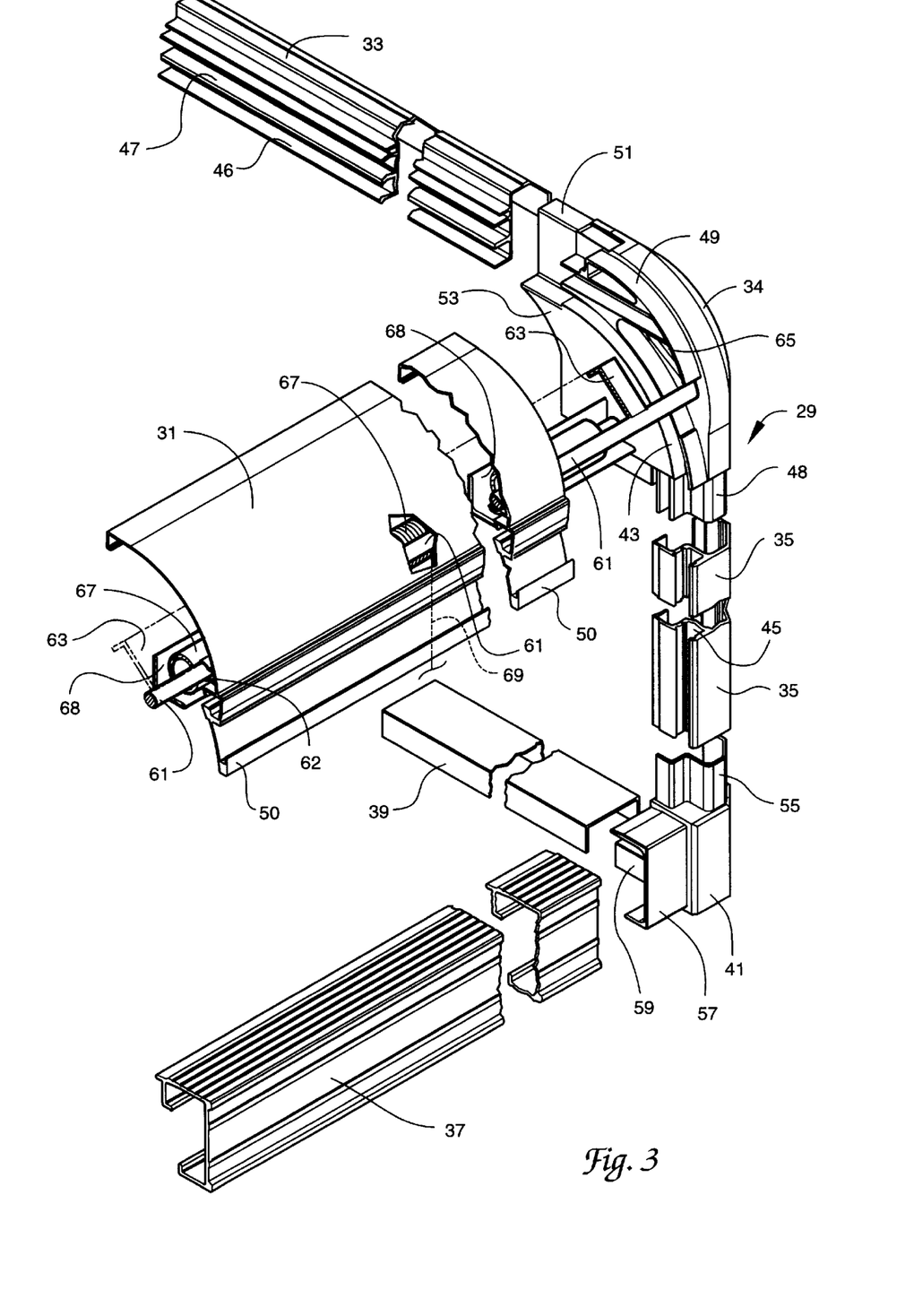
FIG. 3 is an exploded view of the sub-frame assembly of the present invention.
Figure 3A:
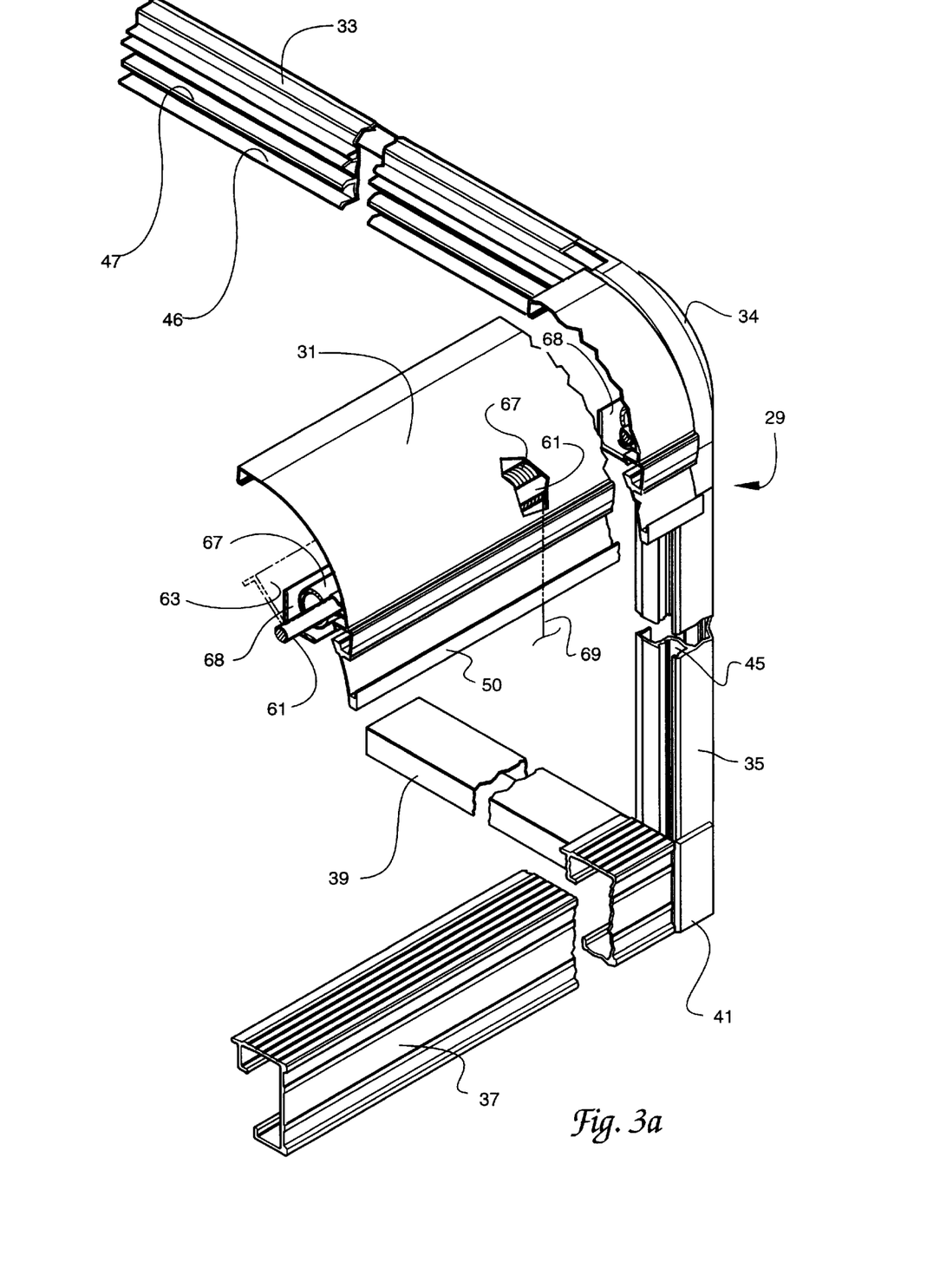
FIG. 3a is an assembled view of the sub-frame assembly of the present invention.

FIGS. 3 and 3a illustrate the sub-frame assembly 29 in, respectively, exploded and assembled condition. Beginning at the top of the sub-frame assembly 29, top corner casting body 34 is formed integrally with a roll-up door track segment 43 which receives the roll-up door 23 (not shown in FIGS. 3 and 3a) for opening and closing movement therein. Corner post 35 has a longitudinally extending door track groove 45 in which roll-up door 23 is also received for movement. Top cross-piece 33 includes a first door track segment 46 which adjoins the door track segment 43 so that the door 23 can be rolled up along a path along the corner post door track groove 45, into the corner casting door track segment 43, and into the front top cross-piece door track segment 46 to bring the door 23 into an open position. A second door track segment 47 is also formed in the top cross-piece 33 for a purpose that will be discussed presently in connection with FIG. 5.

A top corner post lug 48 is formed integrally with top corner casting body 34, and projects outwardly from top corner casting body 34 in a downward direction, and is formed so it can be received in lapping abutment by corner post 35 and lap-welded thereto to make a strong and long-lasting structural connection.

Radius top header 31 extends along the upper edge of truck body 21 to form a portion of the structural framework and exterior covering of truck body 21. A radius top header edge 49 is formed integrally with top corner casting body 34, with the radius top header edge 49 being arranged so that radius top header 31 can be lap-welded to radius top header edge 49 to make a structural connection. Rain gutter 50 is formed at the lower edge of radius top header 31 to capture and divert rain flowing off the truck body 21.

A top cross-piece lug 51 is formed integrally with top corner casting body 34 and projects outwardly from top corner casting body 34 laterally in a direction generally perpendicular to the direction in which radius top header 31 extends along the side of truck body 21. Top cross-piece lug 51 is formed so that it can be received in lapping abutment in top cross-piece 33 and lap-welded thereto to make structural connection.

Preferably, a top gusset stiffener plate 53 is formed integrally with top corner casting body 34 to provide additional structural rigidity and strength to the sub-frame assembly 29 of the present invention. The top corner of a truck body with roll-up doors is particularly vulnerable to racking stresses, and the added strength contributed by top gusset stiffener plate 53 is beneficial.

Turning to the lower portion of the sub-frame assembly 29 of the present invention, bottom corner casting body 41 is formed integrally with an upwardly projecting bottom corner post lug 55, which can be received by corner post 35 in lapping abutment, and lap-welded to corner post 35 to make a structural connection. Roll-up door 23, which is received in the door track groove 45 of corner post 35, in its closed position rests on bottom rail 37 which extends laterally in a direction generally parallel to radius top header 31, so as to form a sill for the roll-up door 23. A bottom rail lug 57 is formed integrally with bottom corner casting body 41 and projects outwardly so it can be received in lapping abutment to bottom rail 37 and lap-welded to bottom rail 37 to make a structural connection. Bottom cross-piece lug 59 is formed integrally with bottom corner casting body 41, projects outwardly in a direction parallel to top cross-piece lug 51, and is formed so that it can be received in lapping abutment by a bottom cross-piece 39 and lap welded thereto for a structural connection.

In accordance with the present invention, corner post 35, top cross-piece 33, bottom cross-piece 39, and bottom rail 37 each have a plurality of side walls which extend laterally in angular relation to one another so as to form a partially enclosed central cavity defined by the side walls. In order to provide strong connections which are advantageously arranged for lap-welding, top corner post lug 48 is formed to be received in the central cavity of corner post 35, top cross-piece lug 51 is formed to be received in the central cavity of top cross-piece 33, bottom corner post lug 55 is formed to be received in the central cavity of corner post 35, bottom rail lug 57 is formed to be received in the central cavity of bottom rail 37, and bottom cross-piece lug 59 is formed to be received in the central cavity of bottom cross-piece 39.

Figure 6A:
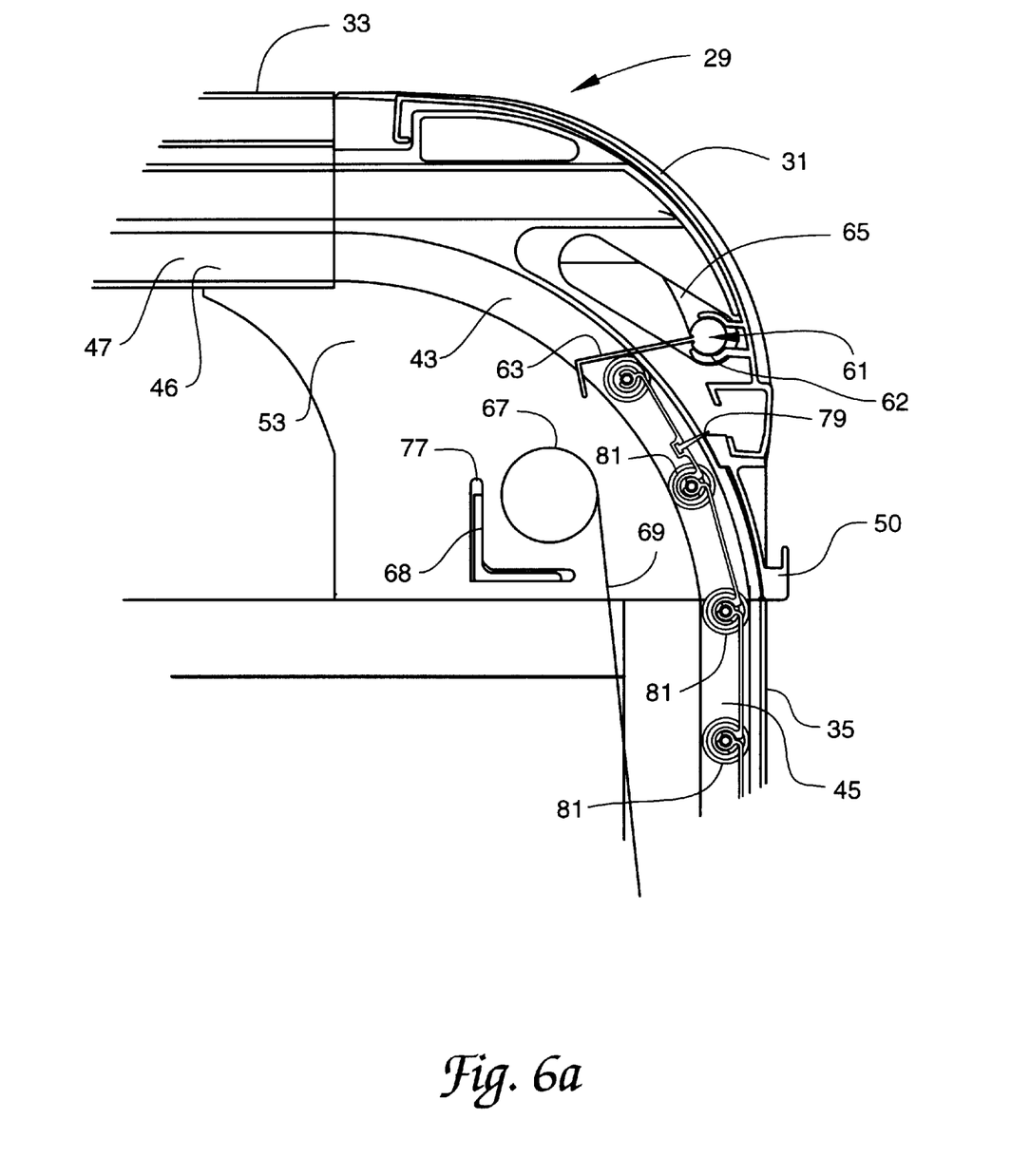
FIG. 6a is a detail view of a portion of the sub-frame assembly of FIG. 3 with the door locked in a closed position.

Turning again to the upper portion of the sub-frame assembly 29, a locking bar 61 is provided for locking the door 23 in a closed position, as shown in greater detail in FIG. 6a. The locking bar 61 is received in retaining groove 62 of radius top header 31 and mounted within the top corner casting body 34 by a conventional actuating mechanism (not shown) which forms no part of the present invention, and which can be actuated, as is well known in the art, to cause the locking bar 61 to rotate about its longitudinal axis. The locking bar 61 includes a latch angle 63 which, as shown in FIG. 6a, can be positioned by rotating the locking bar 61 to block upward movement of the door 23, thereby locking the door 23 in a closed position.

Figure 6B:
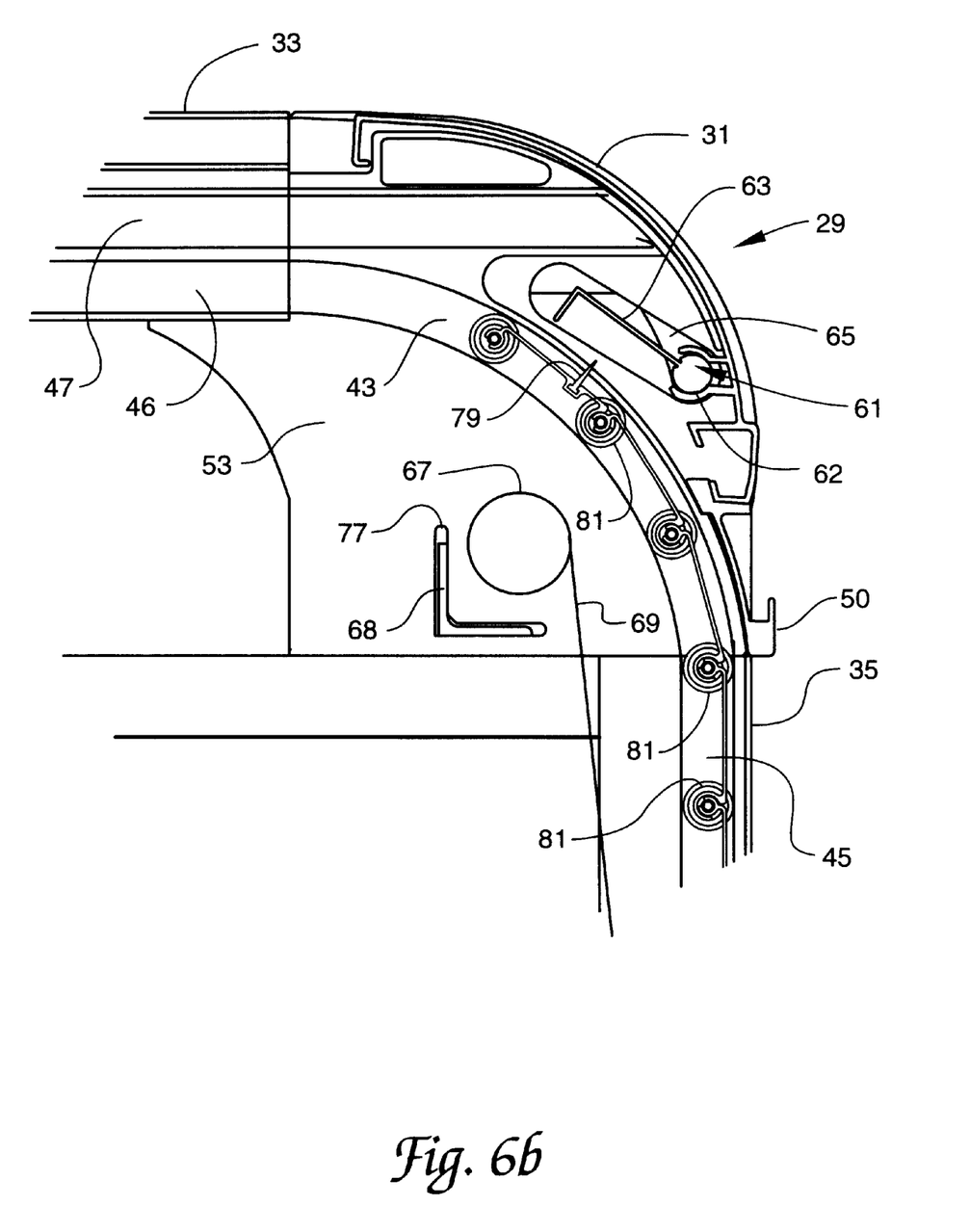
FIG. 6b is a detail view of the assembly of FIG. 6a with the door unlocked.

The locking bar 61 extends into the top corner casting body 34 through a locking bar access aperture 65 which is sized to permit the locking bar 61 to pass therethrough (see FIGS. 6a, 6b). The locking bar aperture 65 is advantageous in circumstances in which the truck on which the truck body 21 is mounted is involved in a collision or is otherwise damaged, which may cause the locking bar 61 to become jammed or lodged in place in its locked position, thereby preventing unlocking of the doors 23. In such a case, the locking bar 61 can be removed, and the doors 23 freed, by cutting an opening in the outer surface of the truck body 21 to gain access to the interior of the top corner casting body 34, and retracting the locking bar 61 through the access aperture 65 and the newly-cut opening.

Under normal conditions, the opening of the doors 23 is assisted by a conventional door counterbalance 67, which is supported by a support angle 68. The door counterbalance 67 is spring-tensioned to exert an upward force on a cable 69 attached thereto, which is in turn attached to the lower portion of each of the doors 23 (see FIGS. 5–6b). The aforementioned upward force provided by the door counterbalance 67 is sufficiently strong to provide an assist to the operator in raising the door 23 to open it, but is not so strong as to prevent easy lowering of the door 23 to its closed position, as is conventional and well-known in the art. The cable 69 wraps around the tubular door counterbalance 67 as the door 23 is raised, and is reeled off as the door 23 is lowered.

Figure 4:
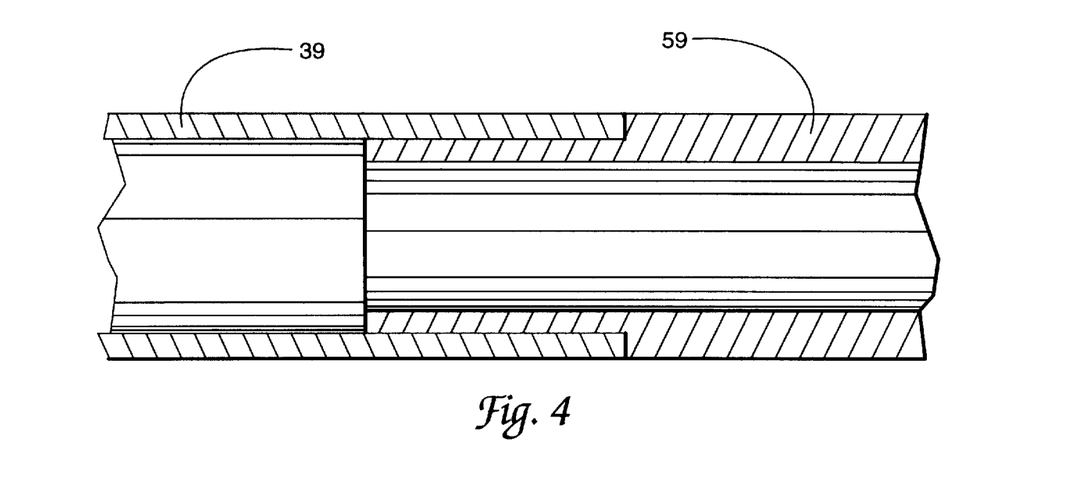
FIG. 4 is a diagrammatic sectional view of the connection of the bottom cross-piece lug and the bottom cross-piece of the present invention.

The lap welded connections made possible by the present invention are shown in FIG. 4. Bottom cross-piece lug 59 is received in, and overlapped by, bottom cross-piece 39. The sleeve-like fitting of a portion of the length of bottom cross-piece lug 59 in cross-piece 39 forms a strong joint which resists stress and is easily welded.

Figure 5:
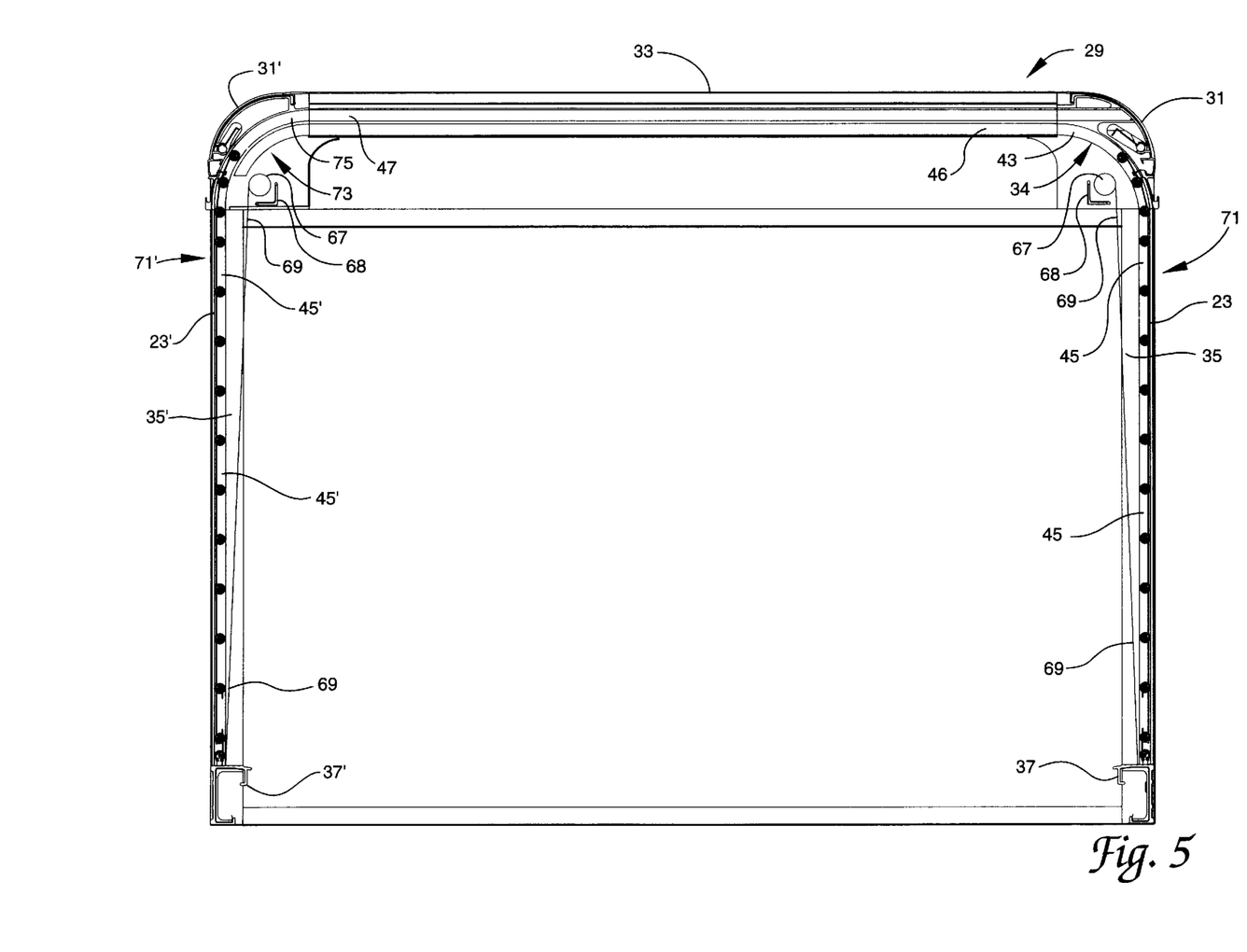
FIG. 5 is a sectional view of a truck body with a roll-up door on each side wall, and illustrating an embodiment of the present invention that includes two top corner casting bodies.

FIG. 5 illustrates a pair of roll-up doors 23, 23' located on opposing side walls 71, 71' of the truck body 21, with the doors 23, 23' oriented in opposed relation. The top corner casting body 34, corner post 35, top radius header 31, bottom rail 37, and associated components are provided, as previously discussed, at the side wall 71, while a second top corner casting body 73, a second corner post 35', a second top radius header 31', and a second bottom rail 37' are provided at the side wall 71' and are joined together in the manner previously described with regard to the top corner casting body 34. The top cross-piece 33 spans the corner casting body 34 and the second corner casting body 73.

As noted above, the top cross-piece 33 includes first door track 46 and second door track segment 47, which respectively adjoin the door track segment 43 of the first corner casting body 34, and a door track segment 75 of the second corner casting body 73. It can be seen that the door track segments 43, 75 of the top corner casting bodies 34, 73 take different paths across their respective corner casting bodies, and these paths are configured so that the top corner casting body track segments adjoin the appropriate track segment 46, 47 of the top cross-piece 33. This arrangement allows both doors 23, 23' to be simultaneously rolled up or raised within the truck body 21 without interfering with each other.

Accordingly, the door 23 can be rolled up or raised so as to travel a path along the door track groove 45, the door track segment 43, and into the first door track segment 46 of the top cross-piece 33; while the door 23' can be rolled up along a path along a door track groove 45' of the second corner post 35', the door track segment 75, and into the second door track segment 47 of the top cross-piece 33. It will of course be understood that lowering of the doors 23, 23' would cause the doors to follow the same paths in reverse. Lifting of the doors 23, 23' is assisted by door counterbalances 67, which are, as discussed above, attached to the lower portions of the doors 23, 23' by cables 69. The support angles 63 are each mounted in respective angle apertures 77 (see FIGS. 6a, 6b) formed in the top corner casting bodies 34, 73.

In FIGS. 6a and 6b, a portion of the sub-frame assembly 29 of the present invention is shown with the locking bar 61 in its locked and unlocked positions, respectively. The door 23 is, in FIG. 6a, in its closed position, and the locking bar 61 has been rotated to bring the latch angle 63 to a locking position in which it prevents upward movement of the door 23. A gasket 79 provides a seal to prevent rain or other foreign material from passing over the top of the door 23 to enter the interior of the truck body 21. FIG. 6a also shows door rollers 81 which allow the door 23 to be rolled up or down along, for example, the door track groove 45, and the top cross-piece 33 and first door track segment 46. In FIG. 6b, the locking bar 61 is shown in its open position, with the latch angle 63 out of the path of the door 23 so as to allow it to be moved upwardly.

Figure 7:
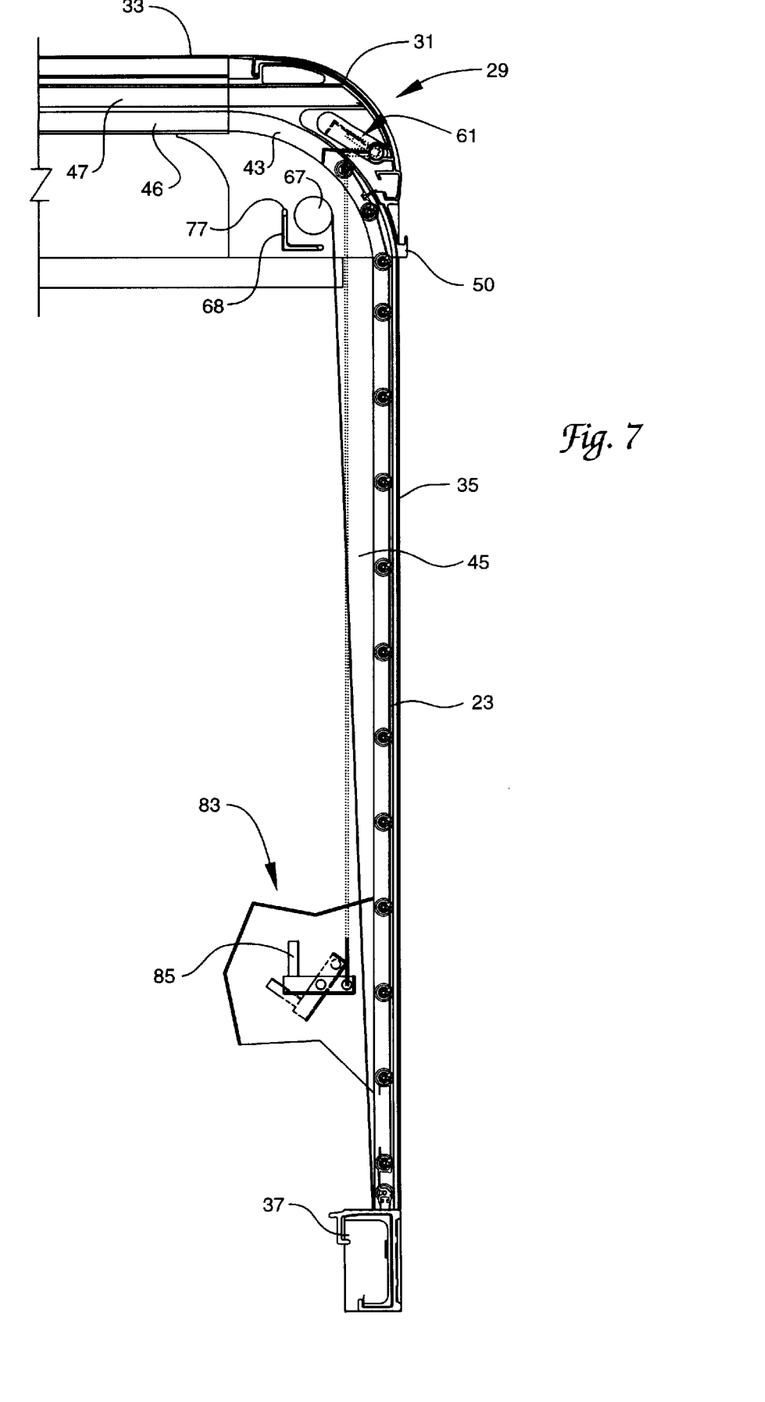
FIG. 7 is a sectional view of the sub-frame assembly of FIG. 3 with an outer wall partially broken away to show a locking bar actuating handle.

FIG. 7 illustrates the sub-frame assembly of the present invention in a cross-sectional view with a portion of the cladding or outer wall 83 of the truck body 21 removed to show an actuating handle 85 for the locking bar 61. The handle 85 is mounted in a location easily reached by an operator, as is conventional, and is connected to the locking bar by a conventional linkage actuating arrangement. Through use of the handle, the locking bar 61 can be easily moved into its locked or unlocked position, as desired.

Assembling the sub-frame assembly 29 of the present invention and incorporating it into the structural framework of the truck body 21 is a highly efficient operation, and is easier and quicker than was possible using known sub-frame assemblies. The various lugs of the top corner casting body 34 and bottom corner casting body 41 are readily inserted into the corresponding structural members of the truck body 21 to form strong structural connections. Lap welding of the lugs and structural members can be easily accomplished, without requiring the use of complex jigs or clamping devices to hold in place the surfaces to be welded. Prior art arrangements, which required fabrication and welding together of the door track, top gusset stiffener plate and other components, which were then butt-welded to the structural members of the truck body, were far more time-consuming and difficult to assemble. Moreover, the structural strength of the connections provided by the present invention is distinctly superior to the strength of the previous butt-welded corner connections. The components of the sub-frame assembly of the present invention may be formed from aluminum or other lightweight metal alloy to save weight yet maintain structural strength, and such components may be formed by extrusion, casting, stamping, or other processes as appropriate without departing from the scope of the present invention.

It will therefore be readily understood by those persons skilled in the art that the present invention is susceptible of broad utility and application. Many embodiments and adaptations of the present invention other than those herein described, as well as many variations, modifications, and equivalent arrangements will be apparent from or reasonably suggested by the present invention and the foregoing description thereof, without departing from the substance or scope of the present. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalents arrangements, the present invention being limited only by the claims appended hereto and the equivalents thereof.

We claim:

1. A sub-frame assembly for a truck body having a roll-up door for loading and unloading cargo therethrough, a radius top header formed with a radius on its lateral axis, an extruded top cross-piece, and an extruded corner post formed with a longitudinally extending integral door track groove, said sub-frame assembly comprising:

(a) a structural top corner casting body;

(b) a roll-up door track segment formed integrally with said top corner casting body, said door track segment being formed for receiving the door therein;

(c) a radius top header edge formed integrally with said top corner casting body said radius top header edge being formed to abut the radius top header at a juncture that will permit the radius top header to be lap welded to said radius top header edge;

(d) a top corner post lug projecting outwardly from said top corner casting body said top corner post lug formed to be received in lapping abutment by the corner post at a juncture that will permit the corner post to be lap-welded to said top corner post lug; and (e) a top cross-piece lug projecting outwardly from said top corner casting body, said top cross-piece lug formed to be received in lapping abutment by the top cross-piece at a juncture that will permit the top cross-piece to be lap-welded to said top cross-piece lug.

2. A sub-frame assembly for a truck body having a roll-up door for loading and unloading cargo therethrough, a radius top header formed with a radius on its lateral axis, an extruded top cross-piece, an extruded corner post formed with a longitudinally extending integral door track groove, an extruded bottom cross-piece, and an extruded bottom rail, said sub-frame assembly comprising:

(a) a structural top corner casting body;

(b) a roll-up door track segment formed integrally with said top corner casting body, said door track segment being formed for receiving the door therein;

(c) a radius top header edge formed integrally with said top corner casting body, said radius top header edge formed to abut the radius top header at a juncture that will permit the radius top header to be lap-welded to said radius top header edge;

(d) a top corner post lug projecting outwardly from said top corner casting body, said top corner post lug formed to be received in lapping abutment by the corner post at a juncture that will permit the corner post to be lap-welded to said top corner post lug;

(e) a top cross-piece lug projecting outwardly from said top corner casting body, said top cross-piece lug formed to be received in lapping abutment by the top cross-piece at a juncture that will permit the top cross-piece to be lap welded to said top cross-piece lug;

(f) a structural bottom corner casting body;

(g) a bottom corner post lug projecting outwardly from said bottom corner casting body; said bottom corner post lug formed to be received in lapping abutment by the corner post at a juncture that will permit the corner post to be lap-welded to said bottom corner post lug;

(h) a bottom cross-piece lug projecting outwardly from said bottom corner casting body, said bottom cross-piece lug formed to be received in lapping abutment by the bottom cross-piece at a juncture that will permit the bottom cross-piece to be lap-welded to said bottom cross-piece lug; and (i) a bottom rail lug projecting outwardly from said bottom corner casting body, said bottom rail lug formed to be received by the bottom rail in lapping abutment at a juncture that will permit the bottom rail to be lap-welded to said bottom rail lug.

3. A sub-frame assembly for a truck body having a roll-up door for loading and unloading cargo therethrough, comprising:

(a) a structural top corner casting having a top corner casting body, an integral roll-up door track segment formed for receiving the door therein, an integral radius top header edge, a top corner post lug projecting outwardly from said top corner casting body, and a top cross-piece lug projecting outwardly from said top corner casting body;

(b) a structural bottom corner casting having a bottom corner casting body, a bottom corner post lug projecting outwardly from said casting body, a bottom cross-piece lug projecting outwardly from said casting body, and a bottom rail lug projecting outwardly from said bottom casting body;

(c) a corner post formed with a longitudinally extending integral door track groove for receiving the door therein and further formed to receive said top corner post lug and said bottom corner post lug at a juncture that will permit said corner post to be lap-welded to said top corner post lug;

(d) a radius top header formed with a radius on its lateral axis to abut said radius top header edge at a juncture that will permit said radius top header to be lap-welded to said radius top header edge;

(e) a top cross-piece, formed to receive said top cross-piece lug at a juncture that will permit said top cross-piece to be lap-welded to said top cross-piece lug;

(f) a bottom cross-piece formed to receive said bottom cross-piece lug at a juncture that will permit said bottom cross-piece to be lap-welded to said bottom cross-piece lug; and (g) a bottom rail formed to receive said bottom rail lug at a juncture that will permit said bottom rail to be lap-welded to said bottom rail lug.

4. A sub-frame assembly for a truck body having a roll-up door for loading and unloading cargo therethrough, comprising, (a) a structural bottom corner casting having a bottom corner casting body, a bottom corner post lug projecting outwardly from said casting body, a bottom cross-piece lug projecting outwardly from said casting body, and a bottom rail lug projecting outwardly from said bottom casting body;

(b) an extruded corner post formed with a longitudinally extending integral door track groove for receiving the door therein and further formed to receive said bottom corner post lug at a juncture that will permit said corner post to be lap-welded to said bottom corner post lug;

(c) an extruded bottom cross-piece formed to receive said bottom cross-piece lug at a juncture that will permit said bottom cross-piece to be lap-welded to said bottom cross-piece lug; and (d) an extruded bottom rail formed to receive said bottom rail lug at a juncture that will permit said bottom rail to be lap welded to said bottom rail lug.

5. The sub-frame assembly of claim 1, further comprising a top gusset stiffener plate formed integrally with said top corner casting body.

6. The sub-frame assembly of claim 2, further comprising a top gusset stiffener plate formed integrally with said top corner casting body.

7. The sub-frame assembly of claim 3, wherein said structural top corner casting includes an integral top gusset stiffener plate.

8. The sub-frame assembly of claim 1, wherein said extruded corner post and said extruded top cross-piece each have a plurality of side walls extending laterally in angular relation to one another so as to form a partially enclosed central cavity defined by said side walls, and said top corner post lug is formed to be received in said central cavity of said corner post and said top cross-piece lug is formed to be received in said central cavity of said top cross-piece.

9. The sub-frame assembly of claim 3, in which said extruded corner post, said extruded top cross-piece, said extruded bottom cross-piece, and said extruded bottom rail each have a plurality of side walls extending laterally in angular relation to one another so as to form a partially enclosed central cavity defined by said side walls, and said top corner post lug is formed to be received in said central cavity of said corner post, said top cross-piece lug is formed to be received in said central cavity of said top cross-piece, said bottom corner post lug is formed to be received in said central cavity of said corner post, said bottom cross-piece lug is formed to be received in said central cavity of said bottom cross-piece, and said bottom rail lug is formed to be received in said central cavity of said bottom rail.

10. The sub-frame assembly of claim 1, wherein the truck body includes a locking bar for selectively locking said door in a closed position, and wherein said top corner casting body defines a locking bar access aperture sized to permit said locking bar to pass therethrough for selective removal from the truck body.

11. The sub-frame assembly of claim 2, wherein the truck body includes a locking bar for selectively locking said door in a closed position, and wherein said top corner casting body defines a locking bar access aperture sized to permit said locking bar to pass therethrough for selective removal from the truck body.

12. The sub-frame assembly of claim 3, wherein the truck body includes a locking bar for selectively locking said door in a closed position, and wherein said top corner casting body defines a locking bar access aperture sized to permit said locking bar to pass therethrough for selective removal from the truck body.

13. A sub-frame assembly for a truck body having a pair of opposed roll-up doors respectively located on opposed sides of said truck body, first and second radius top headers each formed with a radius on its lateral axis, and first and second corner posts each formed with a longitudinally extending integral door track groove, said sub-frame assembly comprising:

(a) a top cross-piece having first and second door track segments formed therein, each of said door track segments being constructed and arranged for receiving one of the doors therein;

(b) a first structural top corner casting body having a first integral roll-up door track segment formed for receiving one of the doors therein and for adjoining said first door track segment of said top cross-piece, a first radius top header edge formed to abut the first radius top header, a first top corner post lug projecting outwardly from said first top corner casting body and formed to be received in lapping abutment by the first corner post, and a first top cross-piece lug projecting outwardly from said first top corner casting body and formed to be received in lapping abutment by said top cross-piece; and (c) a second structural top corner casting body having a second integral roll-up door track segment formed for receiving the other of the doors therein and for adjoining said second door track segment of said top cross-piece, a radius top header edge formed to abut the second radius top header, a second top corner post lug projecting outwardly from said second top corner casting body and formed to be received in lapping abutment by the second corner post, and a second top cross-piece lug projecting outwardly from said second top corner casting body and formed to be received in lapping abutment by said top cross-piece, whereby one of the doors is received for roll-up along said first integral door track segment of said first top corner casting body and said first door track segment of said top cross-piece, and the other of the doors is received for roll-up along said second integral door track segment of said second top corner casting body and said second door track segment of said top cross-piece.

* * * * *